US008195331B2

(12) United States Patent
Myeong et al.

(10) Patent No.: US 8,195,331 B2
(45) Date of Patent: Jun. 5, 2012

(54) METHOD, MEDIUM, AND APPARATUS FOR PERFORMING PATH PLANNING OF MOBILE ROBOT

(75) Inventors: Hyeon Myeong, Yongin-si (KR); Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 713 days.

(21) Appl. No.: 12/314,088

(22) Filed: Dec. 3, 2008

(65) Prior Publication Data
US 2009/0149990 A1 Jun. 11, 2009

(30) Foreign Application Priority Data
Dec. 11, 2007 (KR) .................. 10-2007-0128266

(51) Int. Cl.
G05B 19/18 (2006.01)
(52) U.S. Cl. ............... 700/245; 134/18
(58) Field of Classification Search .............. 700/245, 700/253; 318/568.12, 568.17; 701/23, 25, 701/26; 134/18
See application file for complete search history.

(56) References Cited

U.S. PATENT DOCUMENTS 6,493,607 B1 * 12/2002 Bourne et al. ............ 700/255
6,667,592 B2 * 12/2003 Jacobs et al. ............ 318/568.12
7,053,580 B2 * 5/2006 Aldred ..................... 318/580
7,756,615 B2 * 7/2010 Barfoot et al. ............ 701/25
7,805,220 B2 * 9/2010 Taylor et al. ............. 700/253

FOREIGN PATENT DOCUMENTS

| JP | 2005-211367 | 8/2005 |
| KR | 10-2005-0111138 | 11/2005 |
| KR | 10-2006-0097854 | 9/2006 |

* cited by examiner

Primary Examiner — Dalena Tran
(74) Attorney, Agent, or Firm — Staas & Halsey LLP

(57) ABSTRACT

A method, medium, and apparatus for performing path planning of a mobile robot is provided. The apparatus for performing path planning of a mobile robot includes a coarse map generation unit to generate a coarse map composed of a plurality of cells; a fine map generation unit to generate a fine map composed of a plurality of sub-cells into which at least one of the plurality of cells is divided, and a path generation unit to control the fine map generation unit to generate the fine map with respect to a specified position in the coarse map generated through the coarse map generation unit. The method of performing path planning of a mobile robot includes generating a coarse map composed of a plurality of cells, generating a fine map composed of a plurality of sub-cells into which at least one of the plurality of cells, which neighbors the cell where an obstacle exists, is divided, generating a moving path whereby the mobile robot can pass a narrow passage by using the fine map, and updating the coarse map by reflecting the moving path.

23 Claims, 14 Drawing Sheets

30

METHOD, MEDIUM, AND APPARATUS FOR PERFORMING PATH PLANNING OF MOBILE ROBOT

CROSS-REFERENCE TO RELATED APPLICATIONS

This application is based on and claims priority from Korean Patent Application No. 10-2007-0128266, filed on Dec. 11, 2007 in the Korean Intellectual Property Office, the disclosure of which is incorporated herein in its entirety by reference.

BACKGROUND

1. Field

The present invention relates to a mobile robot, and more particularly to a method, medium, and apparatus for performing path planning of a mobile robot, which can make the mobile robot moving through a narrow area by using a coarse map and a fine map.

2. Description of the Related Art

Generally, a robot developed for use in the field of industry has been used as a part of factory automation or has been used to perform tasks on behalf of a human being under the condition that cannot be overcome by the human being. An example of the robot for home use includes a cleaning robot serving as a leading part that extends heavy industry based robot engineering limited to a robot for industry use to light industry based robot engineering. The cleaning robot includes a driving unit for movement, a cleaning unit for cleaning, and a position measurement unit for measuring the position of the robot itself or the position of a user remote controller.

In a mobile robot such as a cleaning robot, it is the most basic and important function to detect an accurate position of the robot itself. In calculating an absolute position of a mobile robot, a method using beacons which adopts an ultrasonic sensor and is mounted in the home and a method using a GPS (Global Positioning System) for indoor use have been known. In determining a relative position, a method of obtaining the position of a mobile robot by obtaining a rotating speed and a straight traveling speed of the mobile robot and integrating the obtained speeds, a method of obtaining the position of a mobile robot by twice integrating acceleration values obtained from an acceleration sensor, and a method of obtaining the direction of a mobile robot by integrating a rotating speed that is an output value of a gyroscope have been known.

In order for a mobile robot to perform a specified work such as cleaning in a robot movement space, it is required to prepare a map, and for this, separate algorithms for exploring an unknown area are required in addition to a SLAM (Simultaneous Localization And Mapping). Such algorithms correspond to a simple method of locating the whole configuration of the robot movement space through a wall-following and a complicated method of performing path planning by using an active SLAM. Also, even after the map is prepared through the above-described methods, a separate coverage path planning for the mobile robot to thoroughly cover the whole area included in the map is additionally required.

In order for the mobile robot to cover a wide area, a cell decomposition, which divides the whole area into a plurality of cells, makes the robot perform a cleaning of each cell, and then moves the robot to another cell to complete the cleaning of the whole area, has been widely used.

The mobile robot prepares two-dimensional (2D) map information of an environment by using an infrared ray (IR) sensor, an ultrasonic sensor, a laser sensor, and so forth. The map as prepared above is called a grid map. Since this grid map is obtained from sensor data, it has great uncertainty and error.

The conventional mobile robot, however, has the following problems.

In the case of a fine map, which divides the area by using precise grid map that has cells having a size of about 1~2 cm and performs the path planning, in the cell decomposition, path planning for cleaning every nook and corner can be performed. However, in a state that the grid map for the whole area is not completed, the division of the area becomes difficult to cause an inefficient path planning to be performed. In addition, if a grid map having a high resolution is used, large amounts of memory capacity and computations are required, and thus it is impossible to perform the path planning in real time in an embedded system.

In order to solve the above-described problems, a method of performing path planning in a short time by using a coarse map composed of square cells having the same size of several tens of centimeters may be used. In this method, the moving path of the robot is controlled using a coarse map in the range of 20~25 cm that corresponds to the size of a suction port of the mobile robot, and thus a real-time map preparation becomes possible. According to this method, however, since the unit of movement is in the range of 20~25 cm and the coarse map is updated with such a degree of resolution, non-movement of the robot frequently occurs even in an area where the robot can move due to the actual size of the mobile robot, and thus the movement of the mobile robot in every nook and corner becomes impossible.

SUMMARY

Aspects of the present invention solve the above-mentioned problems occurring in the prior art, and the present invention provides a method, medium, and apparatus for performing path planning of a mobile robot by using a coarse map and a fine map, which can make the mobile robot moving through a narrow area by using the fine map when it is judged that movement of the mobile robot is not made even in an area where the mobile robot can move.

In an aspect of the present invention, there is provided an apparatus for performing path planning of a mobile robot, according to the present invention, which includes a coarse map generation unit to generate a coarse map composed of a plurality of cells; a fine map generation unit to generate a fine map composed of a plurality of sub-cells into which at least one of the plurality of cells is divided; and a path generation unit to control the fine map generation unit to generate the fine map with respect to a specified position in the coarse map generated through the coarse map generation unit.

In another aspect of the present invention, there is provided a method of performing path planning of a mobile robot, which includes generating a coarse map composed of a plurality of cells; generating a fine map composed of a plurality of sub-cells into which at least one of the plurality of cells, which neighbors the cell where an obstacle exists, is divided; generating a moving path whereby the mobile robot can pass a narrow passage by using the fine map; and updating the coarse map by reflecting the moving path.

In another aspect of the present invention, there is provided at least one computer readable medium storing instructions that control at least one processing element to implement methods of embodiments.

BRIEF DESCRIPTION OF THE DRAWINGS

These and/or other aspects, features, and advantages will become apparent and more readily appreciated from the following description of embodiments, taken in conjunction with the accompanying drawings of which.

DETAILED DESCRIPTION OF EMBODIMENTS

Figure 1:
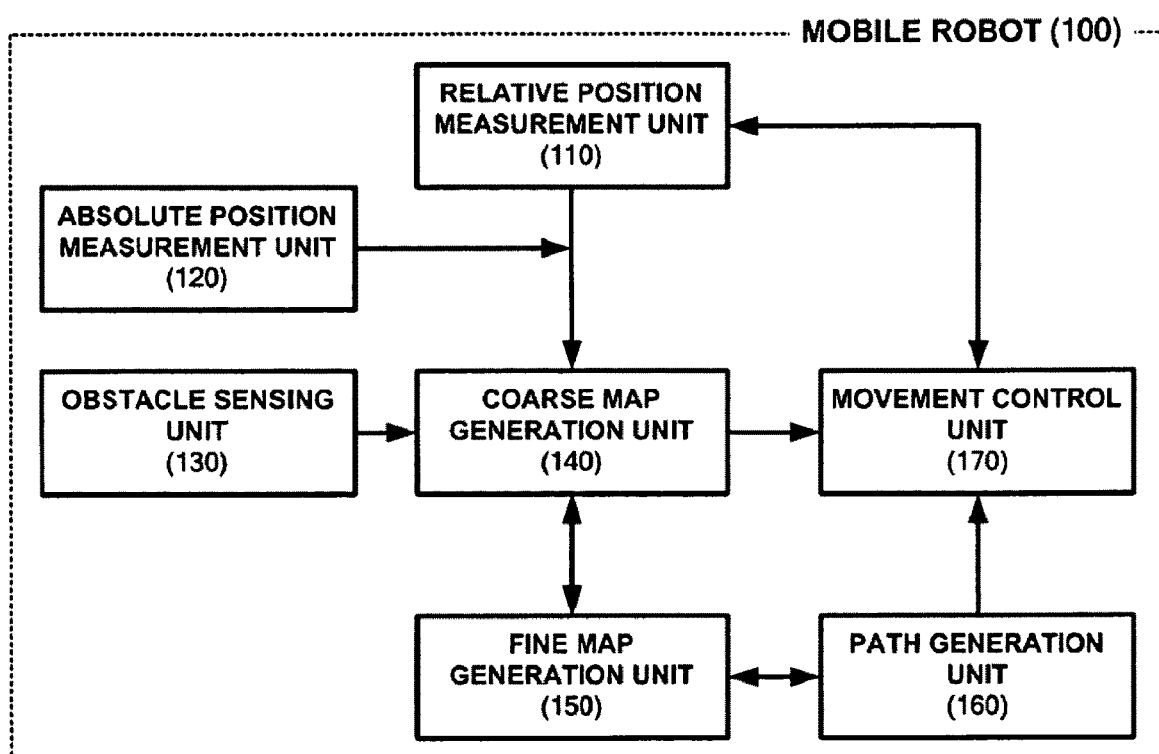
FIG. 1 is a block diagram illustrating the construction of a mobile robot according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

The present invention will be described herein with reference to the accompanying drawings illustrating block diagrams and flowcharts for explaining a method and apparatus for performing path planning of a mobile robot according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, enable implementation of the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In embodiments of the present invention, the term "unit", as used herein, denotes, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and modules or further separated into additional components and modules.

Hereinafter, a method, system, and medium for performing path planning of a mobile robot according to embodiments of the present invention will be described in detail with reference to the accompanying drawings.

FIG. 1 is a block diagram illustrating the construction of a mobile robot according to an embodiment of the present invention.

The mobile robot 100 according to an embodiment of the present invention includes a relative position measurement unit 110, an absolute position measurement unit 120, an obstacle sensing unit 130, a coarse map generation unit 140, a fine map generation unit 150, a path generation unit 160, and a movement control unit 170.

The relative position measurement unit 110 measures the position of the mobile robot 100 by using a relative position recognition module such as an encoder, a gyroscope, an acceleration sensor, and so forth. For example, an encoder is coupled to traveling wheels included in the movement control unit 170, and senses the rotating speed of the traveling wheels. By integrating the rotating speed sensed by the encoder, the position (or moving cost) and the head angle of the mobile robot 100 is obtained. Generally, the position and the head angle of the mobile robot are inclusively called a "pose" of the mobile robot. In addition, the relative position measurement unit 110 can measure the position of the mobile robot 100 by using an absolute position recognition module.

The absolute position measurement unit 120 is a module for calculating the absolute position, and measures the absolute position of the mobile robot by using images taken by a camera or cost information obtained by a range finder. In a case of using a camera as an example of the absolute position measurement unit, a surrounding image suitable to extract feature points can be obtained. The feature points may denote points where inherent features of specified positions can be shown. Although the surrounding image may be an image of a ceiling, a wall surface, or a floor, the image of the ceiling, which has a low possibility of image change and includes a light suitable to extract the feature point, is most suitable as the surrounding image. In this case, the absolute position measurement unit 120 may be composed of a CCD (Charge Coupled Device), a CMOS (Complementary Metal Oxide Semiconductor), or an image capturing unit known in the art, and may further include an ADC (Analog-to-Digital Converter) for converting an analog signal of the captured image into a digital signal.

On the other hand, a feature map can be generated by making the feature point obtained from the surrounding image such as the ceiling image correspond to the position of the mobile robot 100. Accordingly, by comparing the feature point obtained from the captured image with the feature map, the pose of the mobile robot 100, i.e., the position and the head angle of the mobile robot 100, can be easily detected.

The obstacle sensing unit 130 senses a neighboring obstacle during the movement of the mobile robot 100. The obstacle sensing unit 130, for example, may be composed of an infrared (IR) sensor, an ultrasonic sensor, a bumper, and so forth.

The coarse map generation unit 140 generates a coarse map composed of a plurality of cells. Each of the plurality of cells included in the coarse map may include obstacle existence/nonexistence information and path information. That is, the coarse map generation unit 140 measures the pose of the mobile robot 100 by using the feature map, and generates the path map by displaying the obstacle existence/nonexistence and path information for each position of the mobile robot 100 by using pose information and obstacle sensor information provided from the obstacle sensing unit 130.

The path information is information for determining which direction the mobile robot will move in to perform cleaning and map generation works, and it is important to make the mobile robot 100 not pass again a position that the mobile robot has once passed by using the path information. Preferably, the path information includes information indicating whether the cleaning of a specified cell has been completed and information indicating whether the cleaning of the current line including the specified cell and lower lines of the current line has been completed. The coarse map generation unit 140 can detect the path that the mobile robot 100 has passed and the direction in which the mobile robot 100 will move to clean the whole movement space, by using information included in the respective cells of the coarse map.

In an embodiment of the present invention, the coarse map generation unit 140 generates a coarse map based path map that includes a plurality of cells in the unit of several tens of centimeters. In the case where the size of the mobile robot 110 is about 40 cm, it is preferable that the size of the respective cell constituting the coarse map is about 20~25 centimeters corresponding to the size of a suction port of the mobile robot 100. As described above, since the size of the respective cell constituting the coarse map can be increased, the amount of computations and memory capacity can be reduced.

Figure 2:
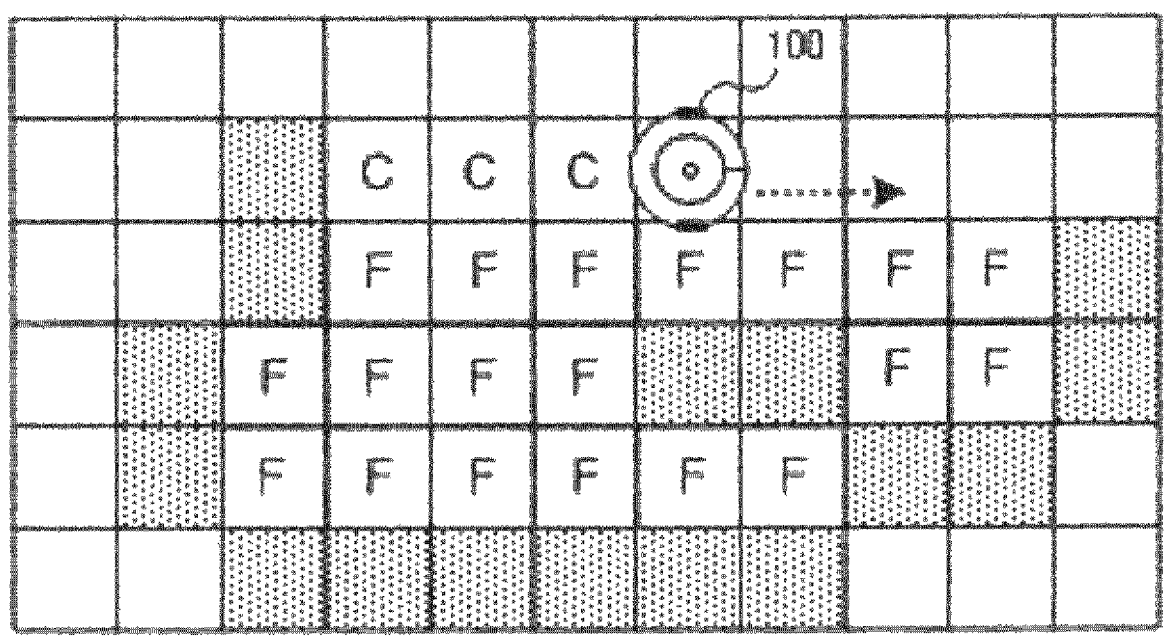
FIG. 2 is a view illustrating an example of indicating three kinds of attributes on cells constituting a coarse map generated through a coarse map generation unit of a mobile robot according to an embodiment of the present invention.
Figure 3:
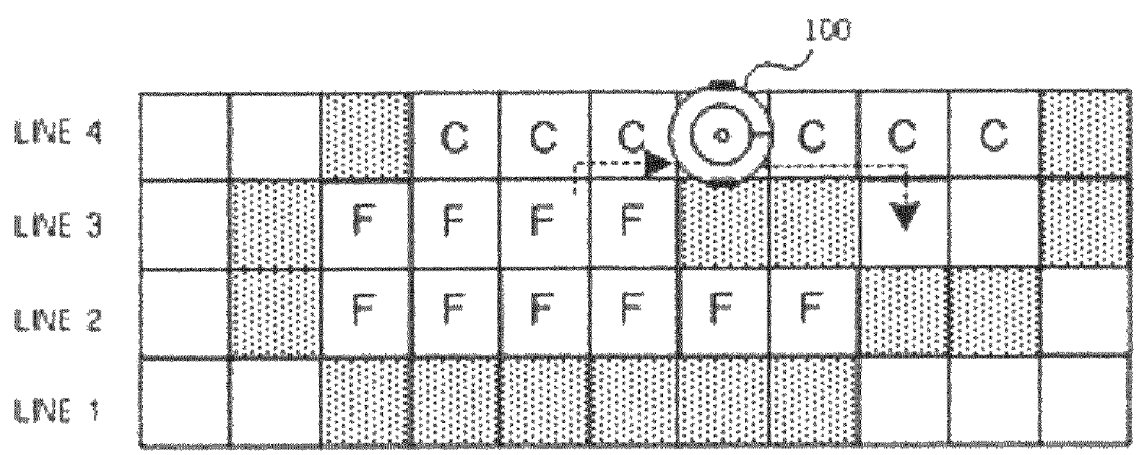
FIGS. 3 and 4 are views illustrating examples of preparing a coarse map in a water-filling method performed by a coarse map generation unit of a mobile robot according to an embodiment of the present invention.
Figure 4:
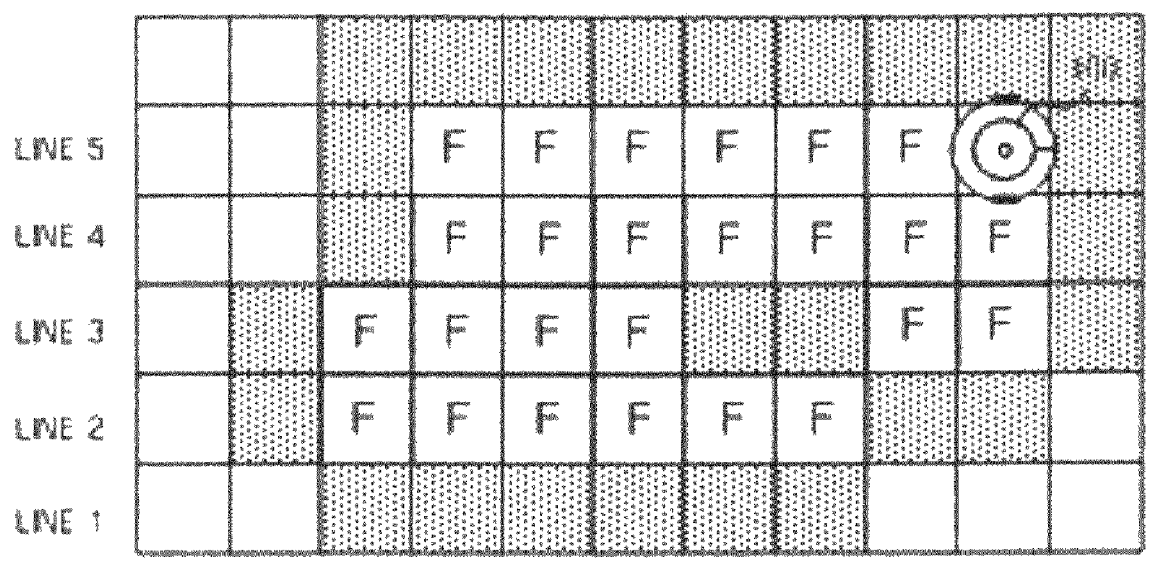

Referring to FIGS. 2 to 4, an example of generating a coarse map through the coarse map generation unit will be described.

FIG. 2 is a view illustrating an example of indicating three kinds of attributes on the cells constituting the coarse map generated through the coarse map generation unit of the mobile robot according to an embodiment of the present invention.

As illustrated in FIG. 2, the coarse map is composed of a plurality of cells having a specified size, and the respective cell includes obstacle existence/nonexistence information and path information. For example, the respective cell that constitutes the coarse map includes any one of a first display indicating that an obstacle exists in the current cell (corresponding to "blocked"), a second display indicating that the cleaning of the current cell is completed (corresponding to "cleaned"), and a third display indicating that the cleaning of the current line included in the current cell and lower lines of the current line is completed (corresponding to "filled"). Here, the blocked cell is indicated as a shade, the cleaned cell is indicated as C, and the filled cell is indicated as F.

The indication "cleaned" and the indication "filled" may correspond to information on which cell the mobile robot 100 will move to and clean, i.e., the path information. Since the cleaned cell denotes that the cleaning of the current cell has been completed, the whole cells included in the line will be changed to filled cells when the cleaning of the line including the current cell is completed.

In an embodiment of the present invention, the coarse map moves the mobile robot 100 to another cell of the line through which the mobile robot has not yet passed until both ends of the line including the plurality of cells are blocked by an obstacle. If the both ends of the line are blocked by the obstacle, the coarse map repeats to move the mobile robot 100 to the next line until the obstacle forms a closed curve. This method is called a water-filling method. That is, if the whole space in the closed curve to be cleaned is filled, the cleaning is completed.

FIGS. 3 and 4 are views illustrating examples of preparing a coarse map in a water-filling method performed by a coarse map generation unit of a mobile robot according to an embodiment of the present invention.

The mobile robot 100 performs the cleaning of cells having no indication and indicates the corresponding cells as cleaned cells as it moves from its initial position to the left. If the mobile robot 100 meets an obstacle during the movement to the left, it indicates the cell corresponding to the position of the obstacle as a blocked cell (i.e., shaded cell), and then moves to the right. With respect to the cleaned cell that the mobile robot 100 meets during the movement, it is not required for the mobile robot 100 to clean the cell. In the same manner, if the mobile robot 100 meets the obstacle during its movement to the right, it indicates the cell corresponding to the position of the obstacle as a blocked cell. If the cleaning of one line of which both sides are blocked by the obstacle is completed, the mobile robot 100 moves to a lower line. The mobile robot 100 performs the above process line by line.

As illustrated in FIG. 3, 6 cells included in line 2 are surrounded by blocked cells, and thus they are indicated as filled cells. In the same manner, 4 cells included in line 3 are surrounded by filled cells located under the 4 cells and blocked cells located on the left and right sides of the 4 cells, and thus they are indicated as filled cells.

After indicating cells in line 2 and line 3 as filled cells, the mobile robot 100 may return to line 4. However, 7 cleaned cells located in line 4 cannot still be changed to filled cells because two cells located at the left end of the 7 cells are surrounded by cells which have no indication and are located under the two cells. Accordingly, the mobile robot 100 can move to the position of the cell having no indication.

AS illustrated in FIG. 4, after the mobile robot 100 processes all the cells which have no indication and remain in line 2 and line 3 as filled cells or blocked cells, the 7 cells in line 4 can be changed to filled cells. Then, in order to continue the cleaning work, the mobile robot 100 moves to line 5 and repeats the work until the blocked cells forms a closed curve. When the whole movement space surrounded by blocked cells is filled with filled cells, the cleaning work is completed.

In an embodiment of the present invention, since the coarse map generation unit 140 performs the path planning by preparing a path map based on the coarse map, the path for cleaning the whole area can be promptly generated with a small amount of computations and a simple algorithm.

If an obstacle exists on the coarse map while the mobile robot 100 moves, the fine map generation unit 150 generates a fine map composed of a plurality of sub-cells into which at least one cell around the cells where the obstacle exists among the plurality of cells has been divided. The fine map can be used for the path generation unit 160 to generate a moving path whereby the mobile robot can pass a narrow passage, which will be described in detail later.

The path generation unit 160 controls the fine map generation unit to generate the fine map with respect to a specified position in the coarse map generated through the coarse map generation unit. That is, the path generation unit controls the fine map generation unit to generate the fine map with respect to at least one cell that is judged to have an obstacle in the coarse map.

The path generation unit 160 generates a path whereby the mobile robot 100 can pass a narrow passage (hereinafter referred to as a "moving path"), in accordance with obstacle existence/nonexistence information and path information included in the coarse map. Also, the path generation unit 160 updates the coarse map by reflecting the moving path.

Preferably, the path generation unit 160 obtains the trace of the moving path by using the fine map generated by the fine map generation unit 150, and then obtains cross cells in which the trace of the moving path crosses the cells where the obstacle exists on the coarse map.

FIGS. 5 to 11 are views illustrating examples of obtaining a trace of a moving path whereby a path generation unit of a mobile robot can pass a narrow passage according to an embodiment of the present invention.

If the mobile robot 100 meets the obstacle as it moves along the path information of the coarse map 142, i.e., if it recognizes a blocked cell 141, it searches for a narrow passage. The narrow passage denotes a passage which is recognized as an obstacle on a coarse map based path, but the mobile robot 100 can actually pass through.

Figure 5:
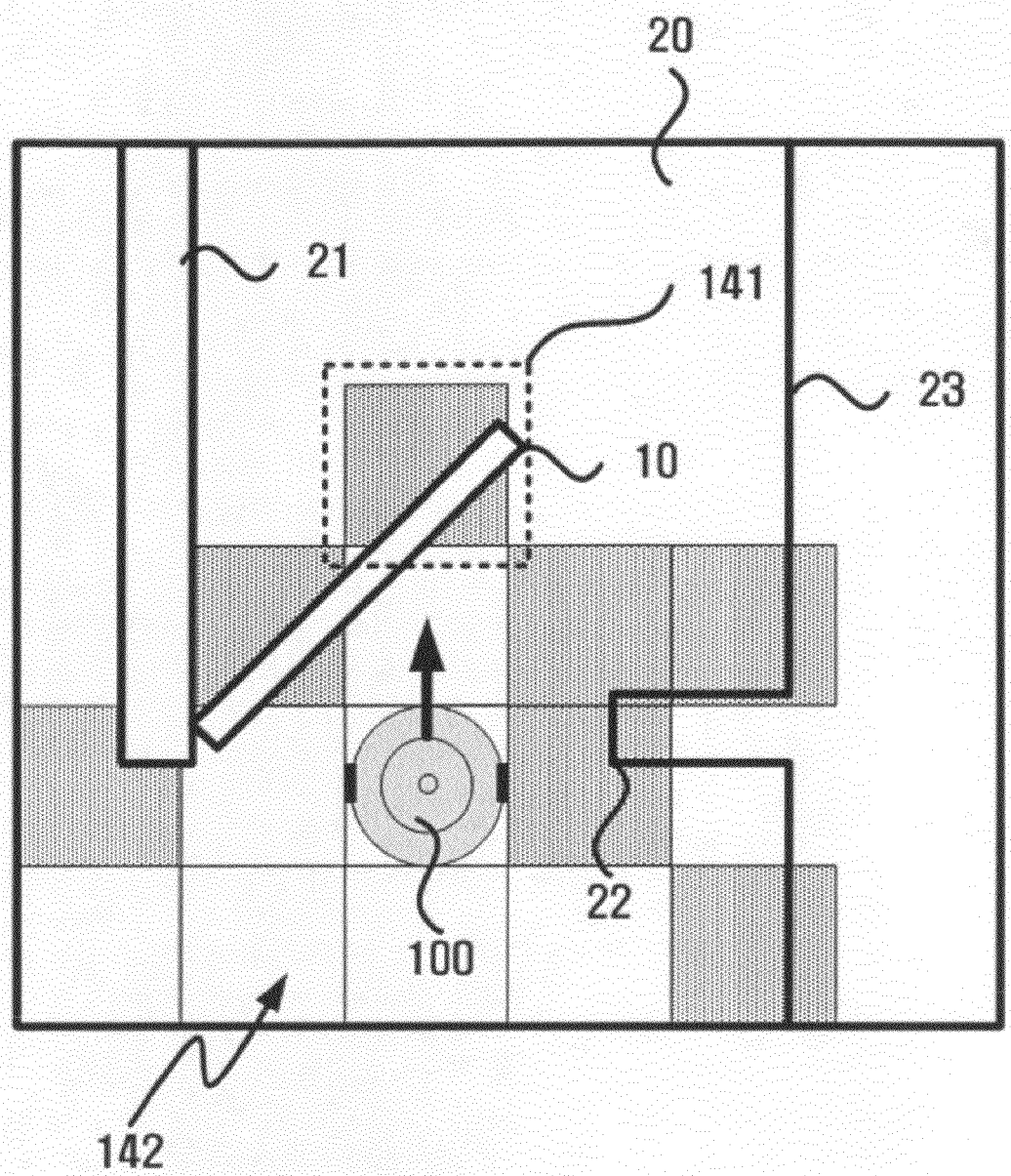
FIGS. 5 to 11 are views illustrating examples of obtaining a trace of a moving path whereby a path generation unit of a mobile robot can pass a narrow passage according to an embodiment of the present invention.

For example, it can be assumed that there is a room 20 in a moving direction of the mobile robot 100. As illustrated in FIG. 5, the room 20 is composed of three walls 21, 22, and 23, and a door 10. If the mobile robot 100 generates the coarse map 142 in this situation, the coarse map 142 includes blocked cells (i.e., shaded cells) due to the three walls 21, 22, and 23 and the door 10. However, it can be seen that a narrow passage, through which the mobile robot 100 can enter into the room 20, is formed between the door 10 and the wall 22.

Figure 6:
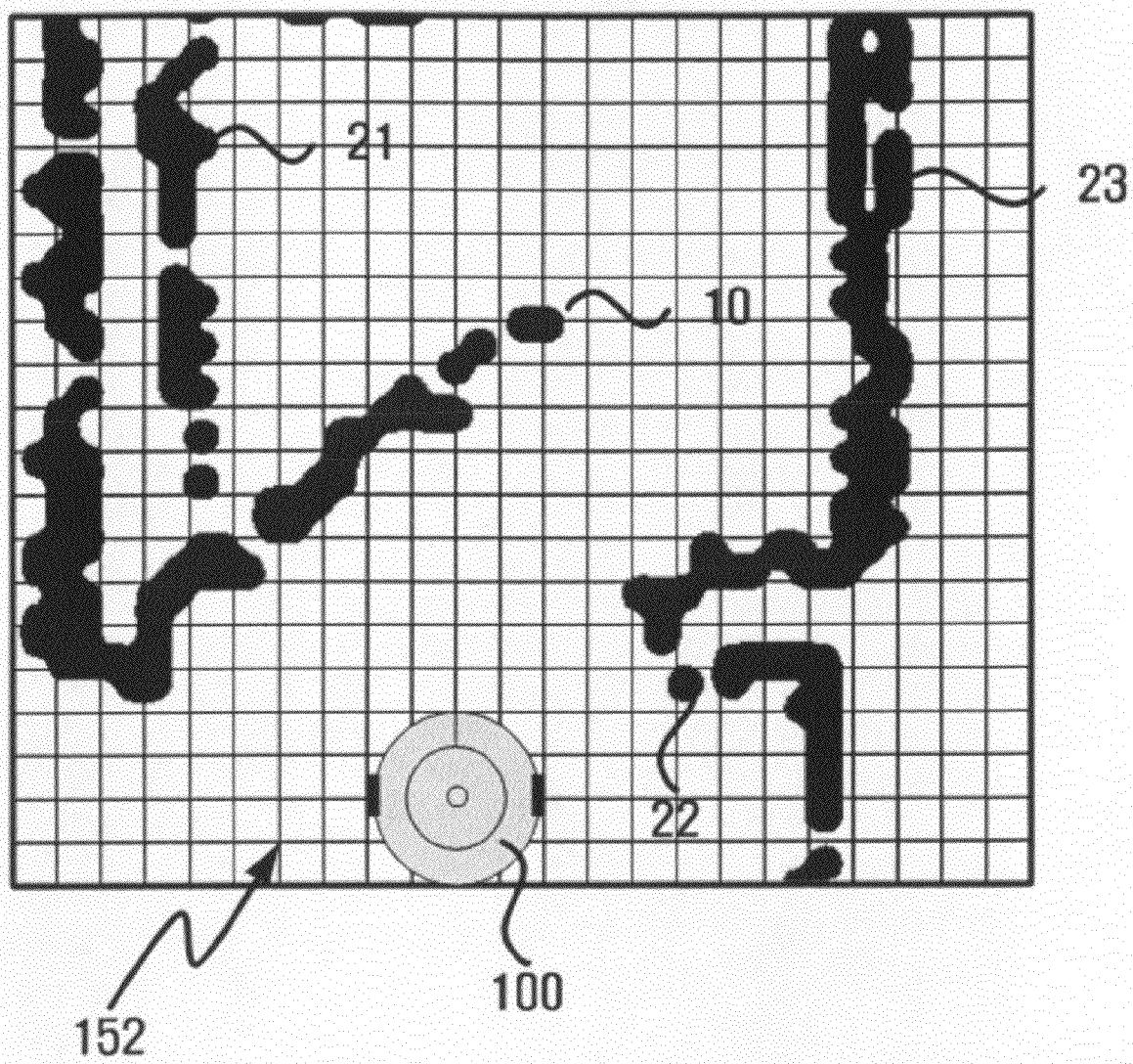

As illustrated in FIG. 6, in order to search for a narrow passage, the fine map generation unit 150 first generates a fine map 152 within a predetermined cost around the obstacle or from the mobile robot 100. FIG. 6 shows an example of the fine map 152 generated in the same environment as that of FIG. 5. Since it is judged that an obstacle exists due to the door 10 as shown in FIG. 5, the fine map 152 is generated around the door 10. For example, if it is assumed that the size of the mobile robot 100 is about 40 cm, a square fine map 152 having a size of about 2 m×2 m around the door 10 is prepared. In this case, the fine map 152 is composed of a plurality of sub-cells into which the cells on the coarse map around the obstacle have been divided. For example, if the size of the respective cell constituting the coarse map is about 20~25 cm, the size of the respective cell constituting the fine map 152 is about 1~2 cm. Accordingly, the fine map 152 includes the path information in a far smaller range than that of the path information of the coarse map, and thus the mobile robot 100 can move more precisely.

After the fine map generation unit 150 generates the fine map 152, the path generation unit 160 obtains the trace 30 of the moving path by using the fine map 152.

In an embodiment of the present invention, in order to obtain the trace 30 of the moving path, the path generation unit 160 removes noise from the fine map 152, generates a configuration space, and then performs an erosion operation in the configuration space.

Figure 7:
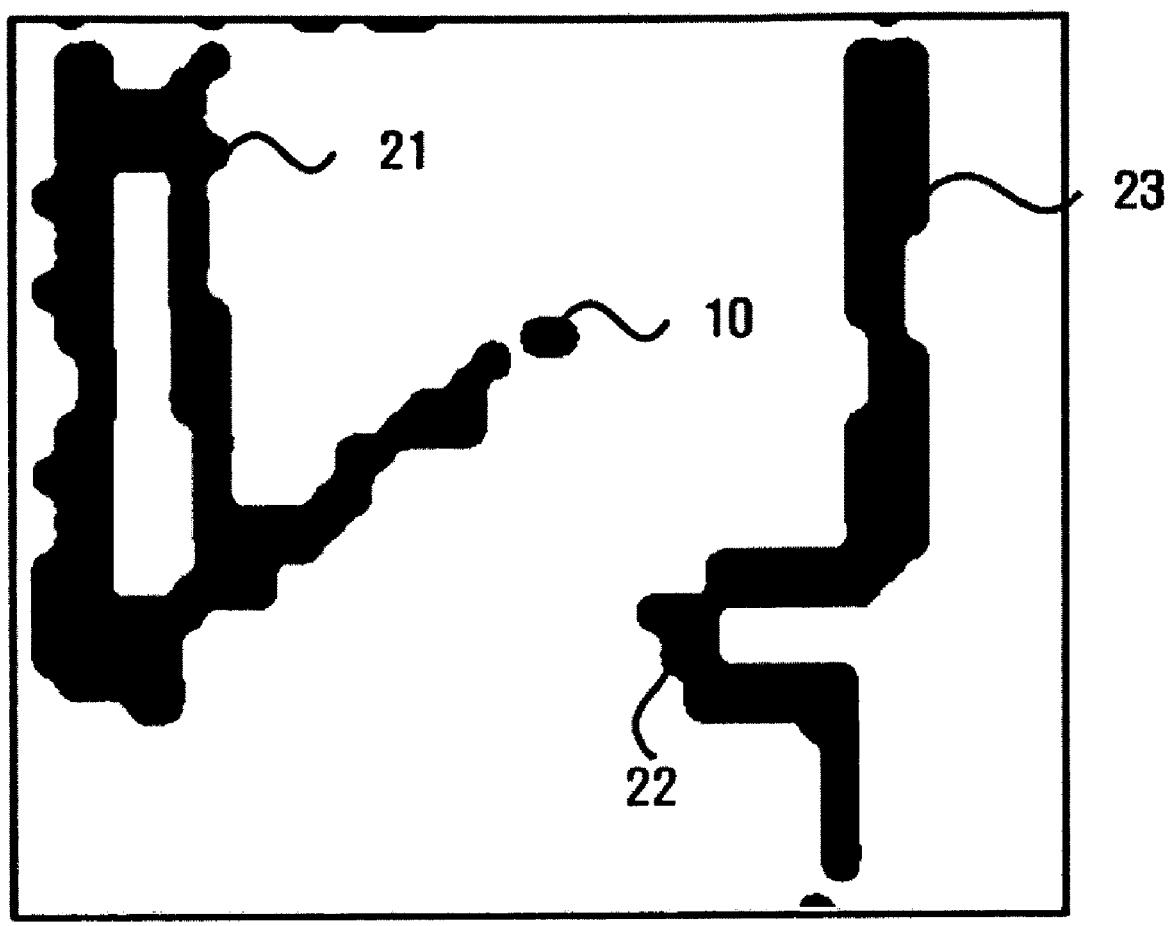

First, in order to remove the noise on the fine map 152, the fine map 152 from which the noise has been removed as shown in FIG. 7 is generated by performing an erosion and dilation work for each pixel of the fine map 152.

Figure 8:
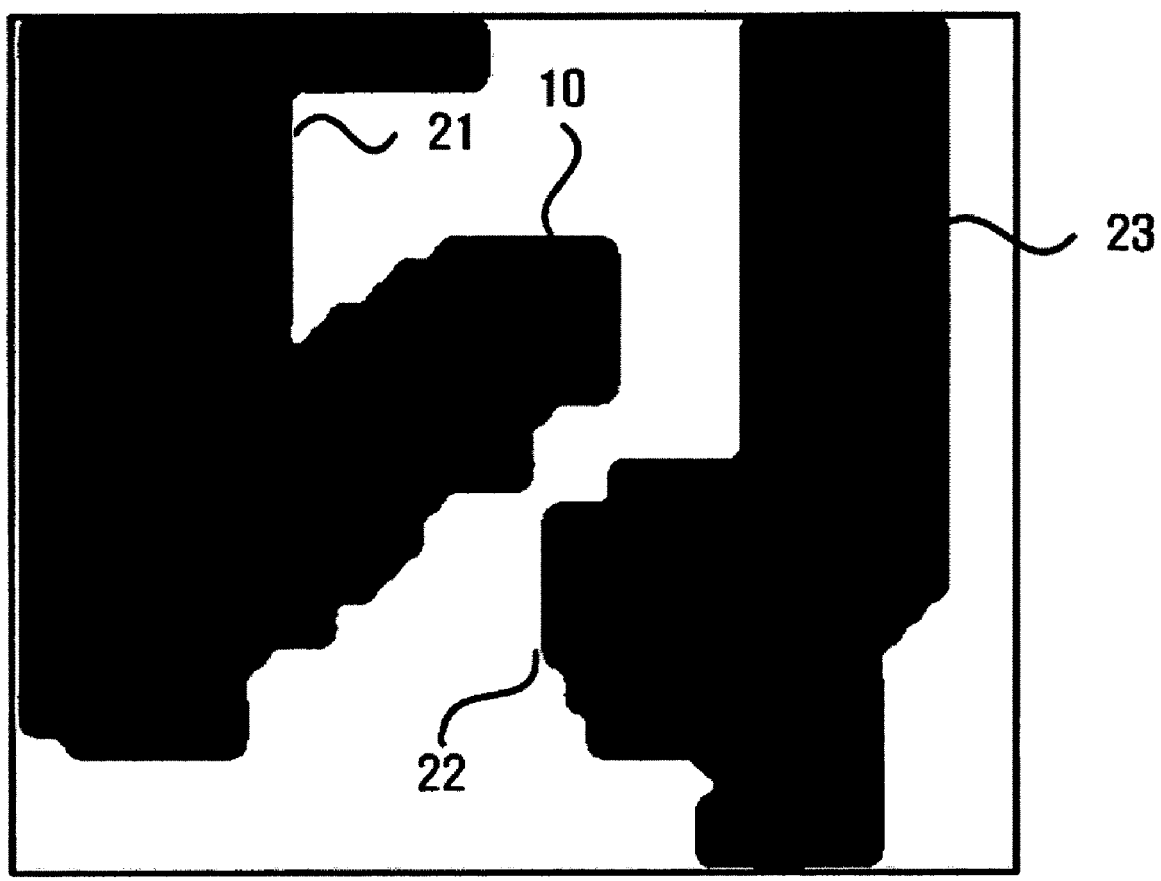

Then, the path generation unit 160 generates the configuration space as shown in FIG. 8 by performing the erosion as large as the radium of the mobile robot 100 with respect to the fine map 152 from which the noise has been removed, in consideration of the size of the mobile robot 100.

Figure 9:
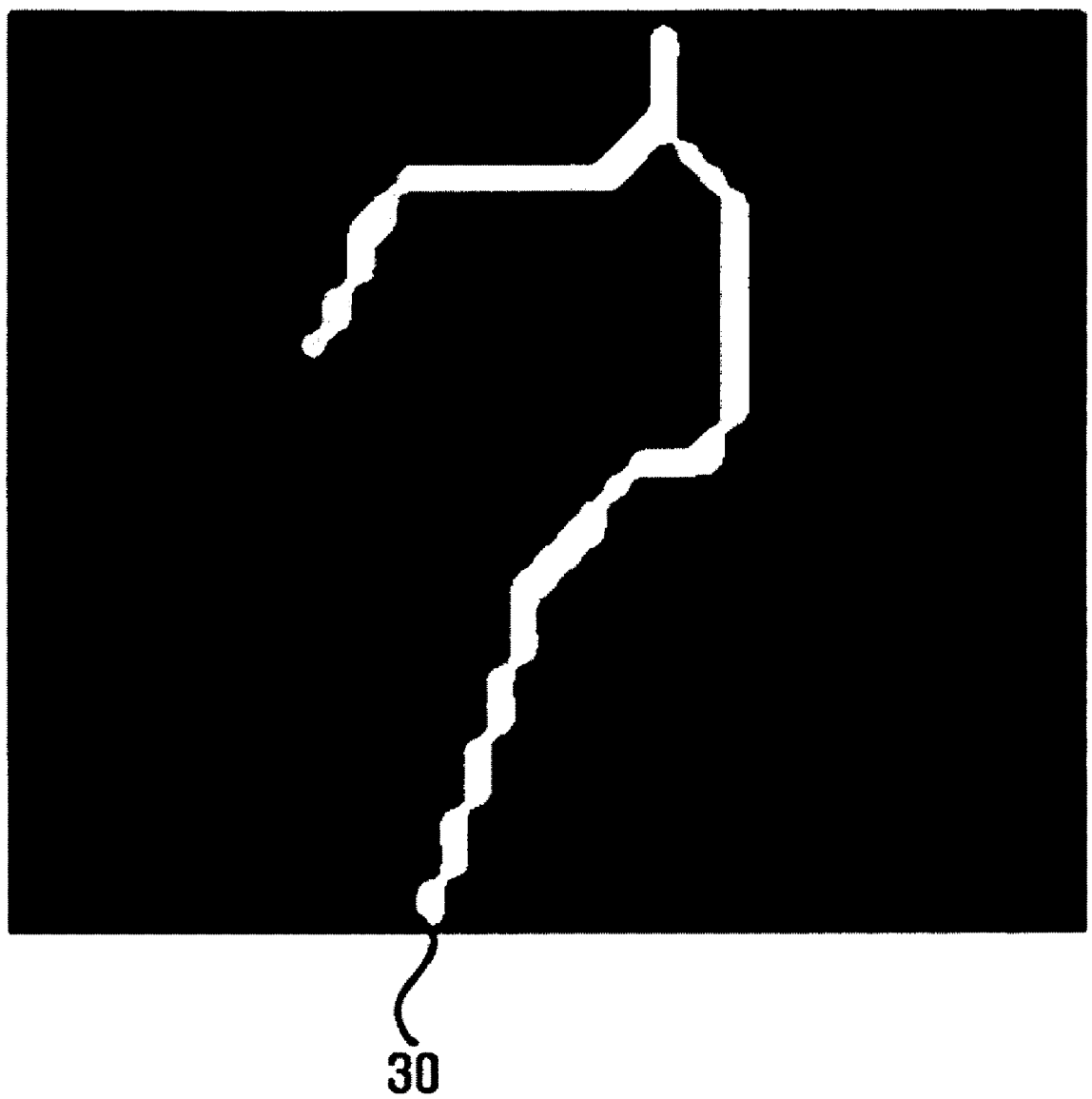
Figure 10:
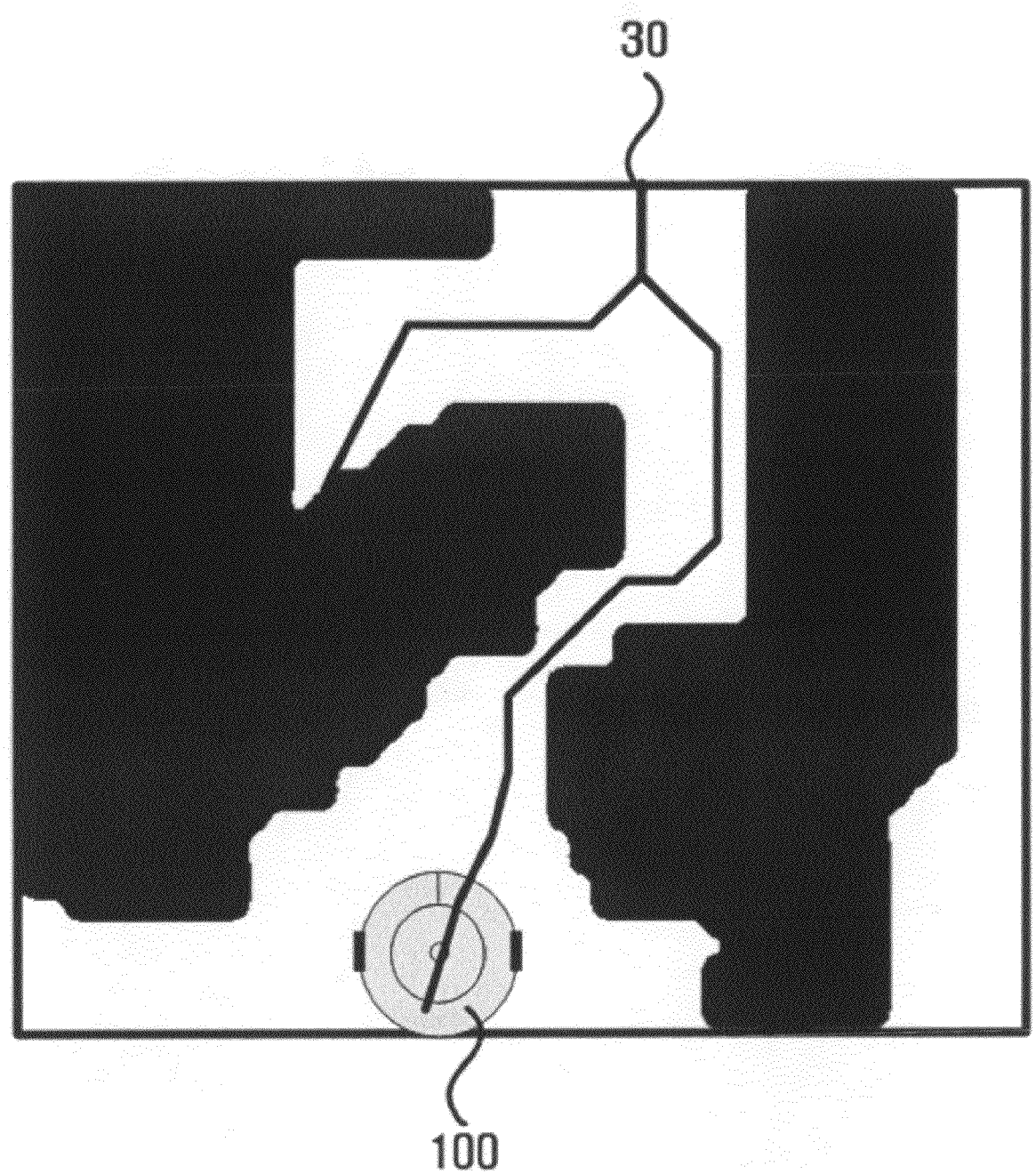

Last, by repeating several times the erosion based on the configuration space as shown in FIG. 8, a thin graph 30 as shown in FIG. 9 is obtained from a line connecting intermediate points located in the same cost from the obstacle. By arranging the thin graph 30 of FIG. 9 on the configuration space of FIG. 8, a map as shown in FIG. 10 can be obtained. In this map, it can be seen that a narrow passage is generated between the door and the wall of the room.

Figure 11:
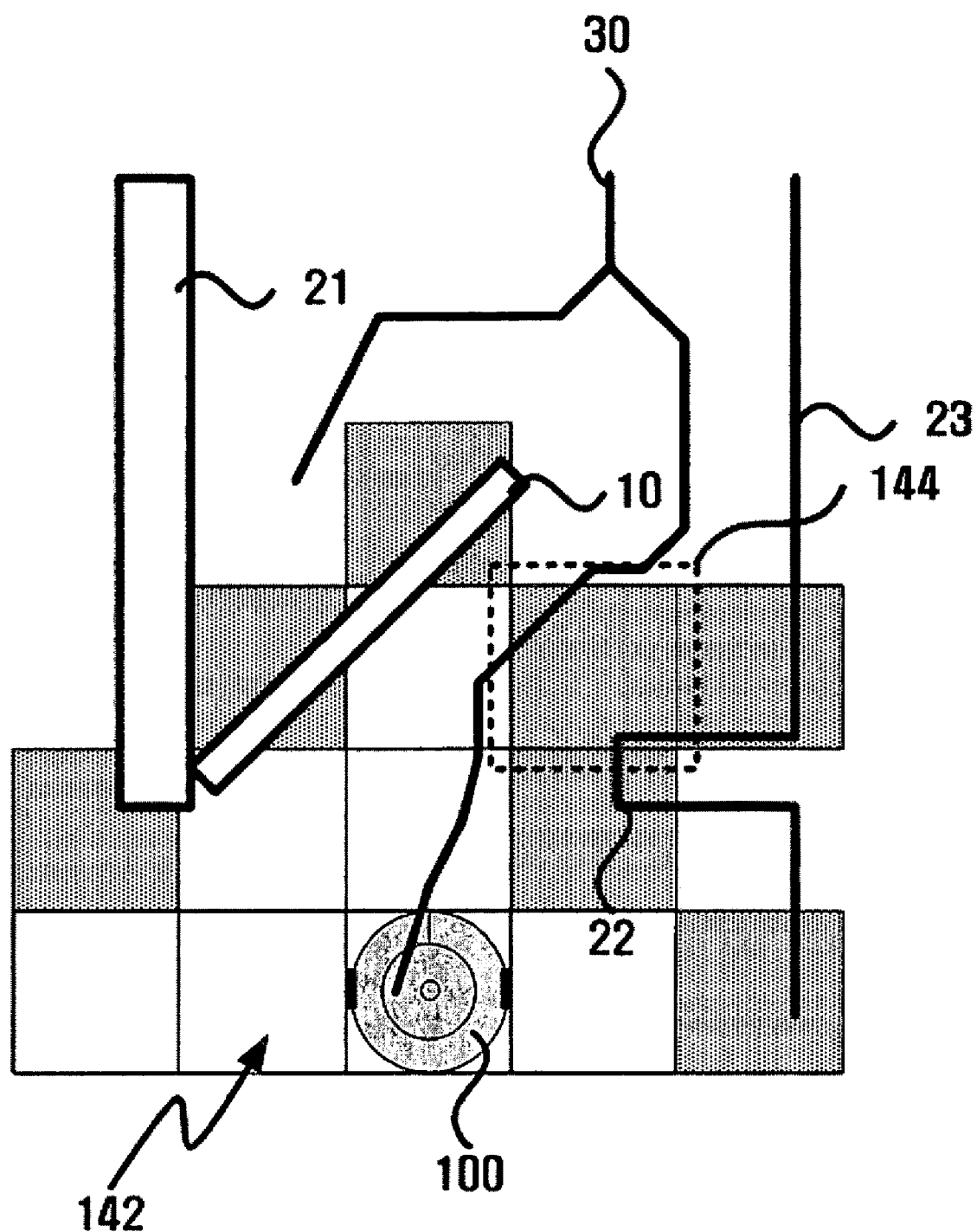

When the trace 30 of the moving path is obtained, the cells through which the mobile robot 100 can pass are searched for by putting the blocked cells through which the mobile robot 100 cannot pass on the coarse map on the trace 30 of the moving path obtained on the fine map 152. If it is assumed that the cell that crosses the trace 30 of the moving path among the blocked cells is a cross cell 144, as shown in FIG. 11, the cross cell 144 can be obtained by combining the coarse map and the trace 30 of the moving path.

Figure 12:
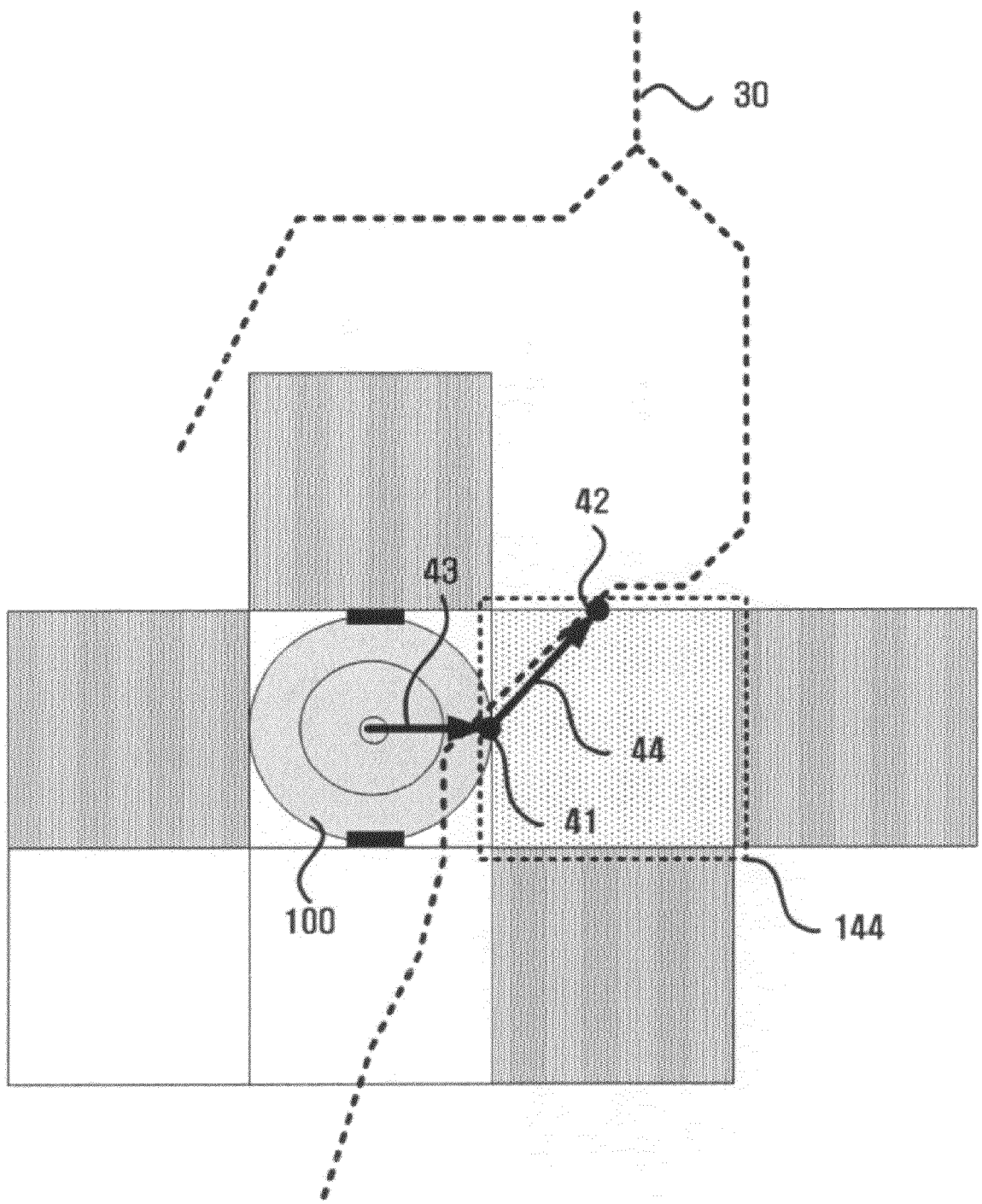
FIG. 12 is a view illustrating an example of obtaining an optimal path to an intermediate destination selected by a path generation unit of a mobile robot according to an embodiment of the present invention.

FIG. 12 is a view illustrating an example of obtaining an optimal path to an intermediate destination selected by a path generation unit of a mobile robot according to an embodiment of the present invention.

The intermediate destination is selected inside the cross cell 144 that crosses the trace 30 of the moving path. If a plurality of cross cells 144 exist, the nearest cross cell 144 is selected as the intermediate destination based on the current position of the mobile robot 100.

For example, as shown in FIG. 12, a point 42 located in the longest cost from the current position of the mobile robot 100 between points 41 and 42 at which the cross cell 144 meets the trace 30 of the moving path is selected as the intermediate destination.

After the intermediate destination is selected, the optimal paths 43 and 44 from the current position of the mobile robot 100 to the intermediate destination are obtained on the fine map 152. As shown in FIG. 12, the optimal paths to the intermediate destination include the moving path 43 provided from the current position of the mobile robot 100 to the point 41 that is nearest to the current position of the mobile robot 100, and the moving path 44 provided from the point 41 to the intermediate destination 42.

Figure 13:
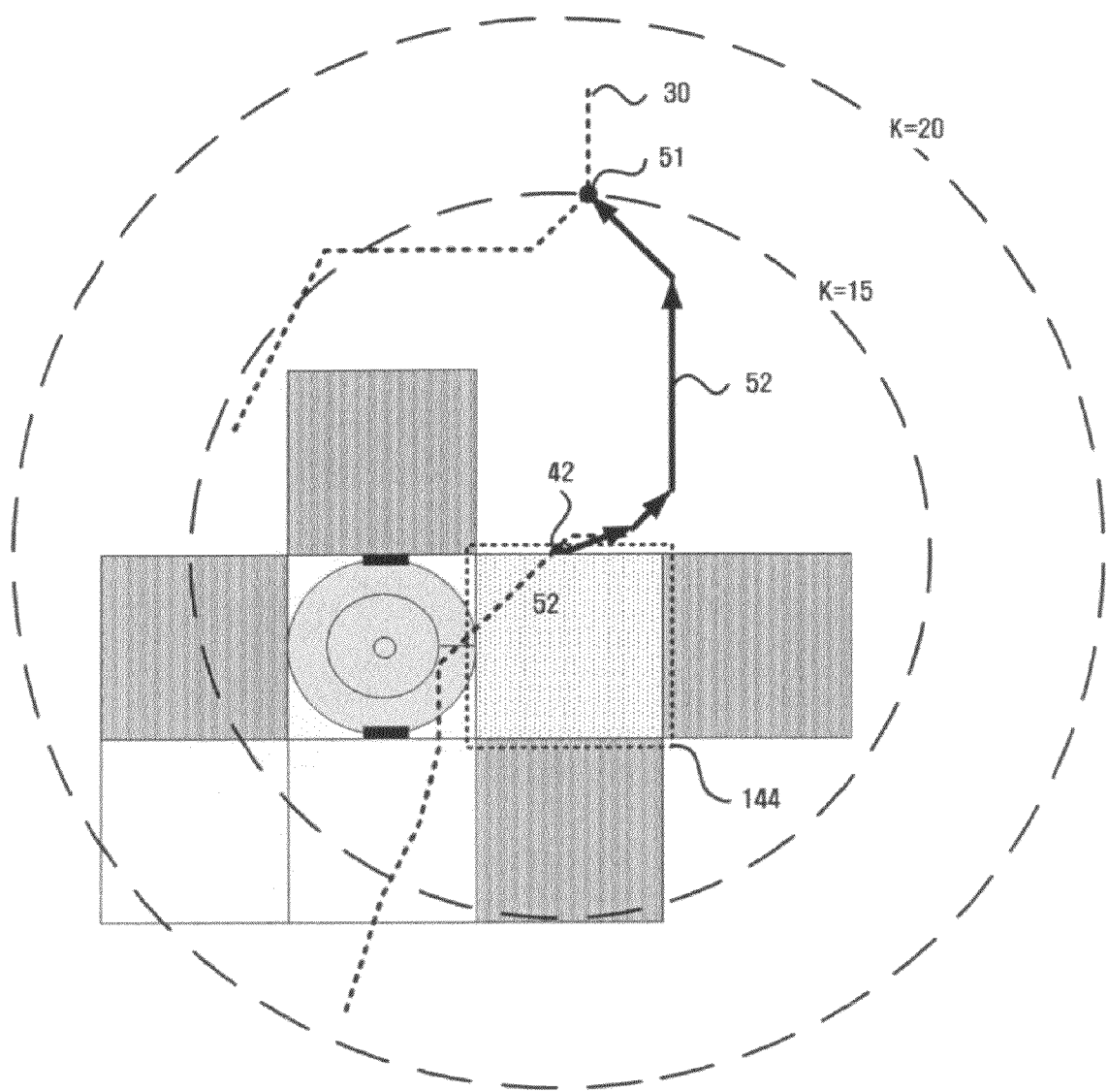
FIG. 13 is a view illustrating an example of obtaining an optimal path to the final destination selected by a path generation unit of a mobile robot according to an embodiment of the present invention.

FIG. 13 is a view illustrating an example of obtaining an optimal path to the final destination selected by a path generation unit of a mobile robot according to an embodiment of the present invention.

The final destination can be selected on the path through a traveling as long as a K cost along the trace 30 of the moving path from the intermediate destination. Here, K is an index indicating a cost for which the mobile robot 100 moves on the fine map 152 from the intermediate destination.

For example, as shown in FIG. 13, the optimal path starting from the intermediate destination can be searched for by searching for the cross point crossing the trace 30 of the moving path through setting of K=20 from the intermediate destination 42. In this case, since the cross point cannot be searched, the path starting from the destination does not exist.

However, by setting K=15, which is lower than K=30, a cross point 51 crossing the trace 30 of the moving path can be searched for. In this case, the cross point 51 is selected as the final destination, and the path 51 provided from the intermediate destination 42 to the cross point 51 along the trace 30 of the moving path is obtained as the optimal path to the final destination.

Here, it is preferable to select the final destination by making the K value maximum. In an embodiment of the present invention as described above, the final destination is selected by gradually reducing the K value. However, the final destination can also be selected by increasing the K value starting from "0". If K=0, it denotes that no path through which the mobile robot 100 further passes exists, and thus the moving path cannot be searched for. In this case, the process of searching for the intermediate destination at the cross cell 144 may be repeated. Also, even in the case where the optimal path to the final destination has been searched for, it can be judged whether the cell belonging to the optimal path is the cell that the mobile robot has already visited. If the cell belonging to the optimal path is the cell that the mobile robot has already visited, it is not necessary for the mobile robot to visit the corresponding cell again. In addition, if the measured cost of the path on the coarse map to the final destination is smaller or equal to the straight traveling cost, it denotes that the final destination is the destination that the mobile robot can reach through a straight traveling on the coarse map, the searched path may be ignored.

As described above, since all the paths through which the mobile robot 100 can move to the final destination have been generated, the mobile robot 100 can travel along the moving path formed on the fine map. If the mobile robot successfully reaches the final destination, the path planning based on the coarse map can be performed again.

In addition, the path generation unit 160 may further include an exception processing unit for processing an exceptional situation occurring while the mobile robot 100 moves to the final destination through the intermediate destination. For example, if the mobile robot 100 cannot reach the final destination, it may be judged that the corresponding area is not detected as an obstacle by the obstacle sensor such as the ultrasonic sensor or the IR sensor, but the mobile robot cannot pass through the corresponding area due to an occurrence of bumping or slipping. Accordingly, the exception processing unit designates the cell of this area as a non-passing cell, and this non-passing cell is excluded when the narrow passage is searched for.

In order to perform the path planning based on the coarse map again after the mobile robot 100 reaches the final destination, the coarse map is updated. In order to update the fine map 152, information stored in the cells of the coarse map 142 that indicates the area through which the mobile robot 100 has moved, for example, a probability value of obstacle existence, is updated in accordance with the position information of obstacles sensed by the obstacle sensing unit 130.

For example, in order to update the probability values of obstacle existence, a following equation can be used.

$$\text{grid}(Gx,Gy)=\text{grid}(Gx,Gy)+I \tag{1}$$

Here, grid(Gx, Gy) denotes a probability value of a cell existing at coordinates (Gx, Gy), and I denotes an increment or decrement of the probability value. A general probability value is represented as a real number in the range of 0~1, and for the sake of convenience, it may be represented as an integer in the range of 0~15. Also, if the value is smaller than 0, it is limited to 0, and if the value is larger than 15, it is limited to 15. For example, if an obstacle exists in the cell, I is set to I=3, while if no obstacle exists in the cell, I is set to I=−1. At the step of initially construct the coarse map, the probability values of all the cells are set to 0, and then the coarse map is updated by setting I values as the mobile robot 100 moves.

Referring again to FIG. 1, the movement control unit 170 controls the mobile robot 100 to move to a position intended by the coarse map generation unit 140. The movement control unit 170, for example, includes a plurality of traveling wheels, a motor driving the traveling wheels, and a motor controller controlling the motor. The straight movement of the mobile robot 100 is performed by making the rotating speeds of the plurality of traveling wheels equal to one another, and the curved movement of the mobile robot 100 is performed by making the rotating speeds of the plurality of traveling wheels different from one another. Generally, the traveling wheels are connected to encoders, respectively.

On the other hand, the mobile robot 100 may include a memory (not illustrated) for storing the coarse map generated by the coarse map generation unit 140 and the paths generated by the path generation unit 160. The memory may be implemented by a nonvolatile memory such as a ROM, a PROM, an EPROM, an EEPROM, and a flash memory, a storage medium such as a hard disk and an optical disk, and other types of memory known in the art.

The operation of the mobile robot as constructed above according to an embodiment of the present invention will now be described.

Figure 14:
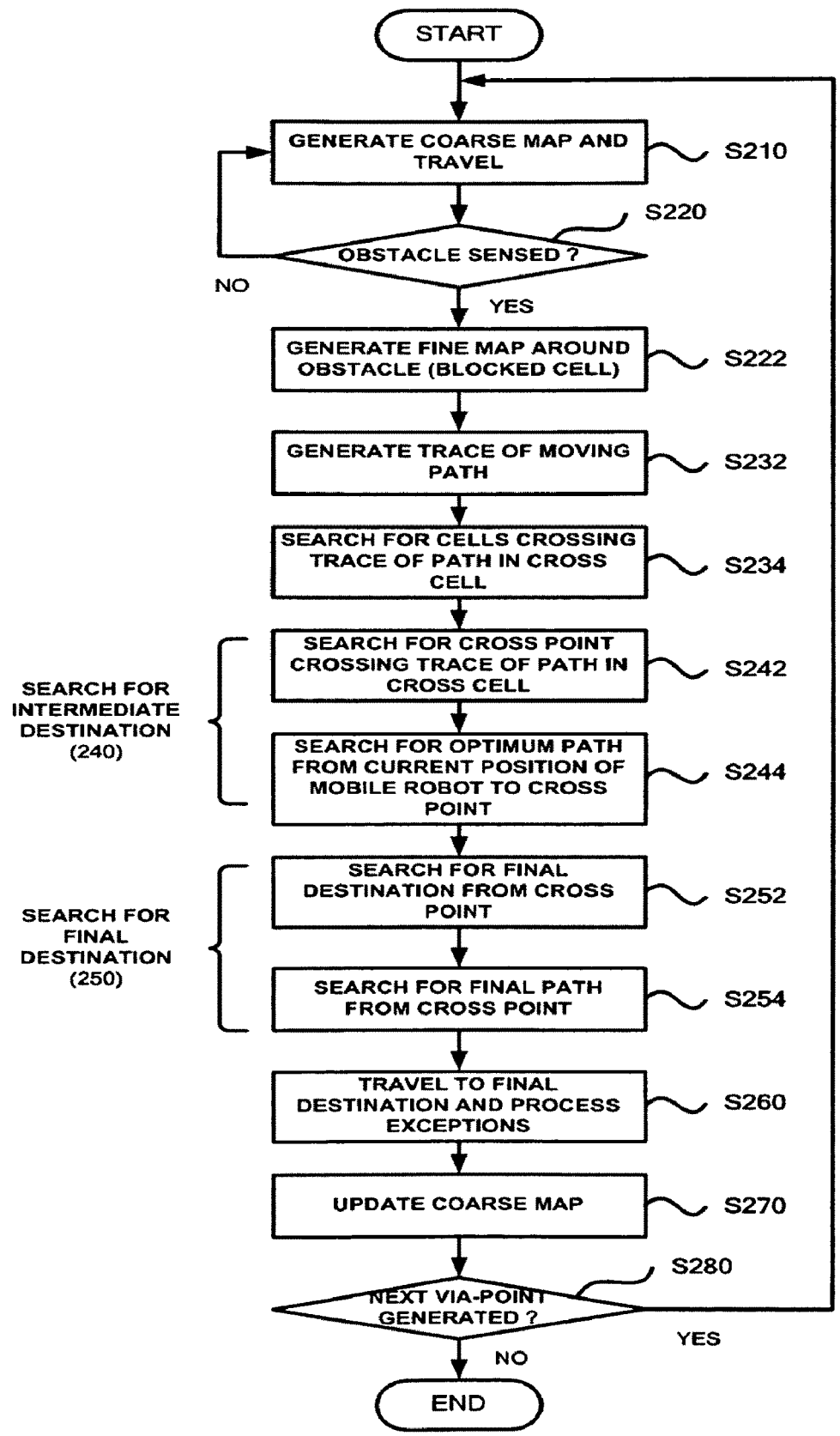
FIG. 14 is a flowchart illustrating a method of performing path planning of a mobile robot according to an embodiment of the present invention.

FIG. 14 is a flowchart illustrating a method of performing path planning of a mobile robot according to an embodiment of the present invention.

First, the coarse map generation unit 140 generates the coarse map 142 and starts the traveling S210. The obstacle sensing unit 130 detects whether an obstacle exists during the traveling of the mobile robot S220. If it is judged that the obstacle exists, the fine map generation unit 150 generates the fine map 152 around the obstacle S222. Then, the path generation unit obtains the trace 30 of the moving path by using the fine map 152 S232, and then obtains the cross cell 144 where the trace 30 of the moving path and the blocked cell on the coarse map cross each other S234.

After obtaining the trace 30 of the moving path and the cross cell 144, the path generation unit 160 determines the intermediate destination from the trace 30 of the moving path S240. The intermediate destination is determined as the farthest cross point among the cross points where the trace 30 of the moving path and the cross cell 144 cross each other S242. Then, the optimal path from the current position of the mobile robot 100 to the cross point is searched for S244.

After the intermediate destination and the optimal path to the intermediate destination are searched for, the path generation unit determines the final destination from the trace 30 ○ the moving path S250. The final destination is determined by using the moving cost of the mobile robot 100 along the trace 30 of the moving path from the intermediate destination S252. Then, the optimal path from the intermediate destination to the final destination is searched for S254.

After the path generation unit 160 searches for the narrow passage and determines the intermediate destination and the final destination, the mobile robot 100 starts traveling along the moving path on the fine map 152, and processes the exceptional situation occurring during the traveling of the mobile robot 100 S260.

When the mobile robot 100 reaches the final destination, the path generation unit 160 updates the coarse map based coarse map 142 and the fine map 152 S270.

Last, the mobile robot 100 judges whether it is necessary to generate another via-point S280, and if it is not necessary to generate another via-point, all processes are terminated (No at S280), while if it is necessary to generate another via-point, the above-described process S210 is repeatedly performed again (Yes at S280).

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing of the computer readable code/instructions.

The computer readable code/instructions can be recorded on a medium in a variety of ways, with examples of the medium including computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), a CD-R (Recordable)/Rewritable, and DVD-R (Recordable/Rewritable). The media may also be a distributed network, so that the computer readable code/instructions is/are stored and executed in a distributed fashion. Still further, as only an example, the processing element could include a processor or a computer processor, and processing elements may be distributed and/or included in a single device.

For example, embodiments can be implemented in computing hardware (computing apparatus) and/or software, such as (in a non-limiting example) any computer that can store, retrieve, process and/or output data and/or communicate with other computers. Software includes computer readable code/instructions. The computer readable code/instructions may form a program. The results produced by the implementation of the software can be displayed on a display of the computing hardware. A program/software implementing embodiments may be recorded on computer-readable media comprising computer-readable recording media discussed above.

Further, according to an aspect of embodiments, any combination of the described features, functions and/or operations can be implemented.

Conventionally, in the case of performing the path planning by using the fine map having a size quite smaller than the size of the mobile robot 100, it is difficult to generate the path through a map generated using cheap noisy sensors, and the configuration space should be changed in real time in consideration of the size of the mobile robot 100, so that a large amount of computations is required. Also, in the case of performing the path planning using only the coarse map according to the size of the mobile robot 100, it frequently occurs that the mobile robot 100 cannot path through a narrow passage.

However, according to a mobile robot according to an embodiment of the present invention, the moving path planning is performed by using the coarse map, and in the case of passing through a narrow passage, the moving path is generated by using a fine map. Accordingly, cheap sensors can be used, and the amount of computations can be reduced.

The present invention relates to the method, medium, and apparatus for performing the path planning for making a map simultaneously with performing the cleaning, and thus can be applied to all the application fields in which a robot should move in a specified area, such as a lawn mower, a painting robot, and so forth, in addition to a cleaning robot.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for performing path planning of a mobile robot, comprising:
   a coarse map generation unit comprising at least one processor to generate a coarse map composed of a plurality of cells;
   a fine map generation unit to generate a fine map composed of a plurality of sub-cells into which at least one of the plurality of cells is divided; and
   a path generation unit to control the fine map generation unit to generate the fine map with respect to a specified position in the coarse map generated through the coarse map generation unit.

2. The apparatus of claim 1, wherein the specified position corresponds to at least one cell provided on the coarse map, in which an obstacle exists.

3. The apparatus of claim 1, wherein the fine map generates a path through which the mobile robot can move, and the generated path has a final destination and an intermediate destination.

4. The apparatus of claim 1, wherein each of the plurality of cells of the coarse map and the plurality of sub-cells of the fine map include obstacle existence/nonexistence information and path information.

5. The apparatus of claim 4, wherein the path information includes information indicating whether cleaning of a specified cell has been completed and information indicating whether cleaning of the current line including the specified cell and lower lines of the current line has been completed.

6. The apparatus of claim 1, wherein the coarse map moves the mobile robot to a cell of a line through which the mobile robot has not yet passed until both ends of the line including the plurality of cells are blocked by an obstacle, and if the both ends of the line are blocked by the obstacle, the coarse map repeats to move the mobile robot to a next line until the obstacle forms a closed curve.

7. The apparatus of claim 1, wherein the path generation unit obtains a trace of a moving path on the fine map, whereby the mobile robot can pass through a narrow passage, and obtains cross cells in which the trace of the moving path and a cell having an obstacle existing therein cross each other.

8. The apparatus of claim 7, wherein the trace of the moving path is generated by removing a noise from the fine map, generating a configuration space, and then performing an erosion operation in the configuration space.

9. The apparatus of claim 7, wherein the path generation unit determines an intermediate destination and a final destination on the trace of the moving path.

10. The apparatus of claim 9, wherein the path generation unit further comprises an exception processing unit to determine mobile robot cannot reach final destination while the mobile robot is moving on moving path to the final destination through the intermediate destination even though obstacle is not detected in area preventing mobile robot from moving on moving path to the final destination.

11. The apparatus of claim 9, wherein the intermediate destination is the farthest cross point from the mobile robot among cross points between the trace of the moving path and the cross cell.

12. The apparatus of claim 9, wherein the final destination is determined by using a cost in which the mobile robot moves along the moving path from the intermediate destination.

13. A method of performing path planning of a mobile robot, comprising:
    generating a coarse map composed of a plurality of cells using at least one processor;
    generating a fine map composed of a plurality of sub-cells into which at least one of the plurality of cells, which neighbors the cell where an obstacle exists, is divided;
    generating a moving path whereby the mobile robot can pass a narrow passage by using the fine map; and
    updating the coarse map by reflecting the moving path.

14. The method of claim 13, wherein each of the plurality of cells of the coarse map and the plurality of sub-cells of the fine map include obstacle existence/nonexistence information and path information.

15. The method of claim 14, wherein the path information includes information indicating whether cleaning of a specified cell has been completed and information indicating whether cleaning of the current line including the specified cell and lower lines of the current line has been completed.

16. The method of claim 13, wherein the generating the coarse map comprises:
    moving the mobile robot to a cell of a line through which the mobile robot has not yet passed until both ends of the line including the plurality of cells are blocked by an obstacle;
    moving the mobile robot to a next line if the both ends of the line are blocked by the obstacle; and
    repeating the first and second steps until the obstacle forms a closed curve.

17. The method of claim 13, wherein the generating the moving path comprises:
    obtaining a trace of a moving path on the fine map; and
    obtaining cross cells in which the trace of the moving path and a cell having an obstacle existing therein cross each other.

18. The method of claim 17, wherein the trace of the moving path is generated by removing a noise from the fine map, generating a configuration space, and then performing an erosion operation in the configuration space.

19. The method of claim 17, further comprising:
    determining an intermediate destination and a final destination on the trace of the moving path; and
    moving robot to the final destination through the intermediate destination.

20. The method of claim 19, further comprising determining mobile robot cannot reach final destination while the mobile robot is moving on moving path to the final destination through the intermediate destination even though obstacle is not detected in area preventing mobile robot from moving on moving path to the final destination.

21. The method of claim 19, wherein the intermediate destination is the farthest cross point from the mobile robot among cross points between the trace of the moving path and the cross cell.

22. The method of claim 19, wherein the final destination is determined by using a cost in which the mobile robot moves along the moving path from the intermediate destination.

23. At least one non-transitory computer readable medium storing instructions that control at least one processing element to implement the method as recited in claim 13.

* * * * *